Patented Nov. 25, 1924.

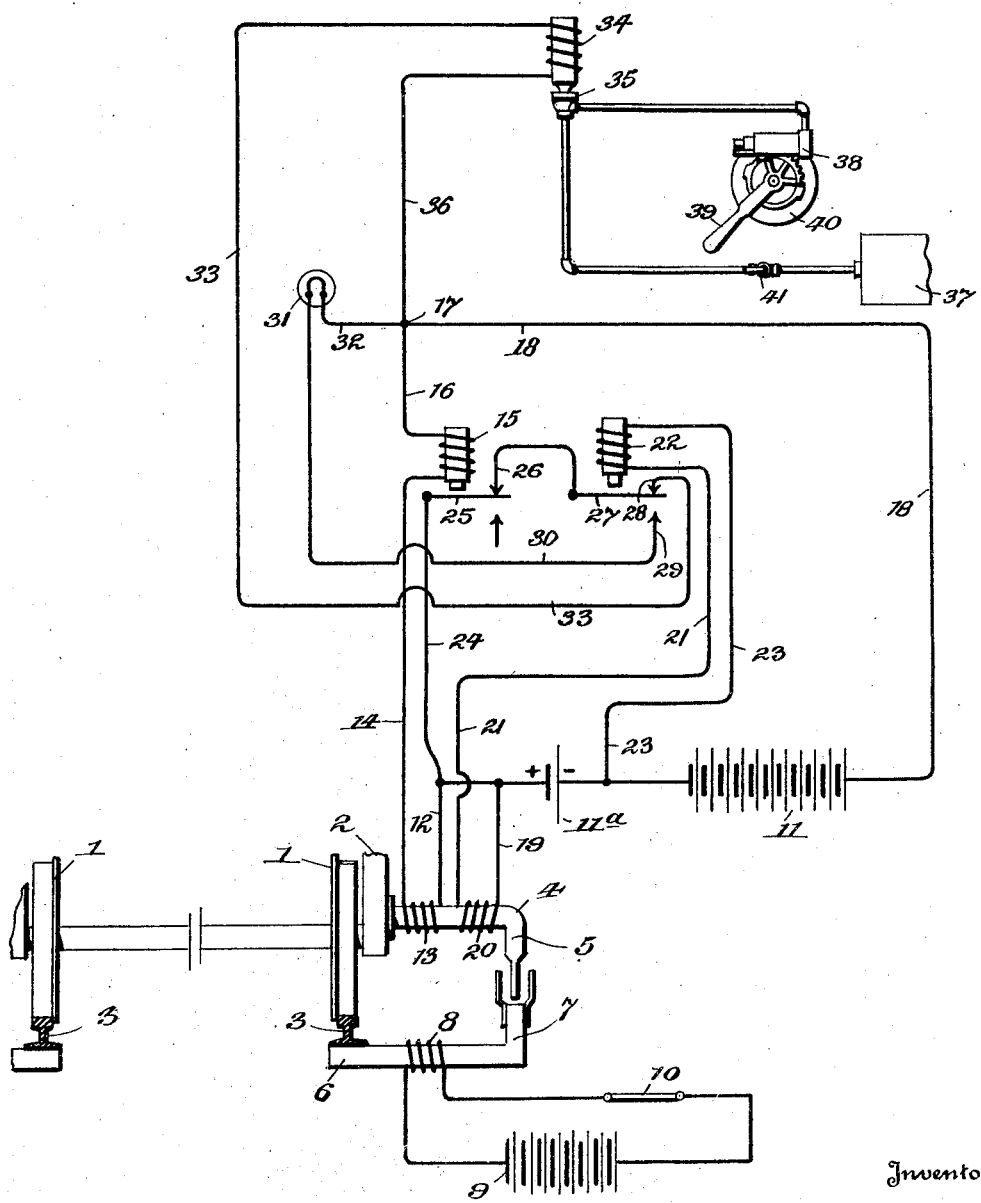

1,516,898

UNITED STATES PATENT OFFICE.

ERWIN C. VROMAN, OF WATERTOWN, NEW YORK, ASSIGNOR TO THE NEW YORK AIR BRAKE COMPANY, A CORPORATION OF NEW YORK.

DEVICE FOR OPERATING TRAIN-CONTROL MECHANISMS.

Application filed April 19, 1920. Serial No. 375,100.

*To all whom it may concern:*

Be it known that I, ERWIN C. VROMAN, a citizen of the United States, residing at Watertown, in the county of Jefferson and State of New York, have invented certain new and useful Improvements in Devices for Operating Train-Control Mechanisms, of which the following is a specification.

This invention relates to inductive apparatus for electrically actuating, or controlling, signals and safety stop devices (either or both) on moving trains, by means of electrical mechanism on or near the track.

Heretofore various inductive devices have been proposed for this purpose. These are usually characterized by the use of one or more permanent magnets as elements of the device, and are dependent on the generation of current in inductive windings carried by the train when these windings move through the field of a permanent magnet on or near the track.

Such systems are not wholly satisfactory, first because the permanent magnets are initially expensive and involve a continual maintenance charge to correct their gradual loss of magnetism, and second because the induced current is dependent in considerable degree on the speed of the train. Consequently certain operation at low train speeds involves the use of comparatively intense fields.

The present invention avoids the use of permanent magnets and renders the functioning of the device independent of train speed. It is also readily embodied in a device functioning on the closed circuit principle at all points so that any failure of the mechanism will operate the signal or stop device or both, according to the particular embodiment chosen.

In the present invention the control mechanism is actuated by an induced current, but unlike the prior devices this induced current is generated in a secondary winding by the sudden increase in flux density of a field created by a primary winding when the reluctance of the magnetic circuit is suddenly changed.

In the preferred embodiment, the train carries a soft iron core having a long air gap between its opposite poles. This core carries two windings. One is a primary winding constantly excited by a relatively heavy current. The other is a secondary or impulse winding which is in circuit with a relay, and is constantly excited by a relatively small current whose purpose is to fix the normal condition of the relay. The windings are opposed to each other and the flux produced by the main winding strongly predominates. Consequently the total resultant flux is in the direction of the flux produced by the main winding, and a sudden increase in this resultant flux will induce a momentary reverse current or impulse in the secondary winding, sufficient to actuate the relay. This sudden increase in flux is secured by placing a soft iron armature on the track in such position that it will bridge the poles of the core on the train as the train passes, and hence will reduce the reluctance of the magnetic circuit. To prevent, when desired, such action by the armature, the latter is provided with windings included in a controllable circuit. When excited these windings oppose the resultant flux in the core so that the armature has no effect.

This general principle of operation may be embodied in various ways and may be used to actuate various types of signal and various types of train stop. In order to indicate its possibilities I illustrate in the accompanying drawing an embodiment of my system in which both track and train circuits are closed in the "line-clear" condition. I show, in the simplest form, a signal lamp and a brake-applying device, which are typical of these two classes of device.

In the drawing the system is shown in diagram, both track and train circuits being shown in "line-clear" position, and at the moment when the core on the train is passing the armature on the track.

A wheel is shown at 1, a locomotive side frame or iron truck frame at 2, and a track rail at 3. A soft iron core 4 with a downward extension 5 is fixed to the frame 2, substantially in the plane of the axis of wheel 1. A soft iron armature 6 with an upward forked extension 7 is fixed to rail 3 at each point on the line where it is desired to control apparatus on the train. Where such apparatus is to be actuated by, or in harmony with, block or other roadside signals the locations of the armature 6 will approximately coincide with the locations of such signals.

The parts above described are so dimensioned that extension 5 passes between the arms of forked extension 7 as the train moves along the track, and at the moment of passage and in the inert condition of armature 6, a magnetic circuit of relatively low reluctance is offered by wheel 1, frame 2, core 4, and armature 6. At all other positions of the train on the track that portion of this magnetic circuit carried by the train has high reluctance because of the long air gap between wheel 1 and extension 5.

The form of the extensions 5 and 7 may be variously modified to minimize the air gap between them, and to reduce their tendency to accumulate snow and ice. The use of the wheel and frame as elements of the magnetic circuit is a convenient arrangement which avoids a second air gap in the magnetic circuit, and thus permits the use of larger clearances than is otherwise possible.

The armature 6 carries a suitable winding 8 which is in circuit with a battery 9 and switch 10. The switch 10 may be actuated manually, or may be connected so as to be actuated by, or in harmony with, any roadside signal. Such connections are familiar to those skilled in the art and hence are not illustrated. In the embodiment of the invention here shown, switch 10 is closed when the line is clear.

The train carries a battery 11 consisting preferably of secondary cells. I have successfully used a twelve cell Edison battery, taking the current for the main circuits from all twelve cells, and taking the current for the impulse or induction circuit from one end cell 11$^a$ of the same battery. To clarify the diagram I show the cell 11$^a$ spaced from the others. From the positive terminal of battery 11, i. e. from the positive terminal of cell 11$^a$, a circuit leads by wire 12 to main exciting winding 13 on core 4, thence by wire 14 to relay winding 15, thence by wire 16 to junction 17, and thence by wire 18 to the negative terminal of battery 11.

A second circuit, which I call the impulse or induction circuit, leads from the positive terminal of cell 11$^a$ by wire 19 to inductive winding 20 on core 4, thence by wire 21 through relay winding 22, and from winding 22 by wire 23 to the negative terminal of cell 11$^a$. While I prefer to take the current for the circuit just described from one cell 11$^a$ of the battery 11, it is obvious that this is simply a convenient way of securing a constant low voltage current through windings 20 and 22 which with the cell 11$^a$ form in effect a complete and independent circuit. Other arrangements are obviously possible.

The windings 13 and 20 are so related to each other that the field induced by winding 13 is opposed to and overpowers the field induced by winding 20. Furthermore, the field induced by winding 8 is such in intensity and direction as to oppose in the desired degree the resultant field of windings 13 and 20. A wire 24 leads from the positive terminal of battery 11 to armature 25 controlled by relay winding 15. Whenever the winding 15 is energized, as it is in the normal condition of the system, armature 25 is held against contact 26, which in turn is connected to armature 27 controlled by relay winding 22. The armature 27 contacts alternately with two opposed contacts 28 and 29. Its normal ("line-clear") position is against contact 28, and it is so retained as long as winding 22 is energized. The momentary de-energization of winding 22 or the reversal of current flow therein will cause armature 27 to drop against contact 29 and remain there until manually reset. Relays of this type are well known in the art.

Contact 29 is connected by wire 30 to lamp 31 or other equivalent signal device, which in turn is connected by wire 32, junction 17 and wire 18 to the negative terminal of the battery. Contact 28 is connected by wire 33 to winding 34 of magnet-valve 35, this winding being connected to the negative terminal of battery 11 by wire 36, junction 17 and wire 18. Magnet-valve 35 is typical of a wide variety of train stop devices. For purposes of the present description it is shown as of the type in which energization of its winding 34 holds the valve closed. The valve controls the flow of pressure fluid from a reservoir 37 (for example, the main air reservoir), to a pressure motor 38 geared to the handle 39 of the engineer's brake valve 40.

The operation of the motor moves the valve handle so as to produce a service application of the brakes.

The valve 41 is a stop valve, normally sealed open, and serving when closed to cut out the stop mechanism.

When the train is running under normal conditions, relay armatures 25 and 27 are up, closing the circuit through battery 11 and magnet-valve winding 34 so that magnet-valve 35 is held closed and motor 38 is inert. Lamp 31 is out, its circuit being broken at 29. Windings 13 and 20 are both energized, winding 13 opposing and overpowering 20. Suppose that the train attempts to pass a signal set against it, and that the signal in question is connected to switch 10 in such manner that the switch is open when the signal is set against the passage of the train. Winding 8 and armature 6 are inert. At the moment of passage of core 4 past armature 6, the reluctance of the magnetic circuit through windings 13 and 20 is greatly reduced, and the resultant increase in flux is sufficient to induce a momentary reverse current in winding 20. This reverse impulse by reversing the current in winding 22, causes armature 27 to drop. As a result, lamp 31 is lighted and valve 35 is allowed to open by the de-energization of its winding 34. The opening of valve 35 applies the brakes by admitting pressure fluid to motor 38, which functions to move the engineer's brake valve to application position.

Normal conditions may be restored by resetting relay armature 27. A bleed port relieves motor 38 of pressure.

Suppose that the signal is clear as the train approaches (the relay armatures 25 and 27 being up as before). In this case switch 10 is closed. The winding 8 and battery 9 are so chosen that armature 6 exerts practically no effect on the reluctance of the magnetic circuit including wheel 1, frame 2 and core 4, because of the opposing field generated by winding 8. As a consequence no reverse impulse is generated in winding 20 and armature 27 remains up.

The purpose in using relay armature 25 is to apply the brakes in the event of failure of the circuit through winding 13. The failure of the circuit through winding 20 would apply the brakes and light the signal light by dropping armature 27. Failure of the magnet-valve circuit on exhaustion of the battery will cause magnet-valve 35 to open. Failure of the circuit through winding 8 or failure of battery 9 will actuate the stop mechanism on any passing train.

The valve 41 when closed will allow a train to proceed when the electrical equipment is disabled in any of the ways above mentioned.

The general scheme and apparatus above set forth may be embodied in various specifically different types of apparatus, and may for example be duplicated or modified to operate "caution" signals, "danger" signals, train stops, or various other special indicators which it may be found desirable to operate on the train from a control station and while the train is in motion. The present application is drawn to the broad principles involved, and only such details of the signal and stop mechanism as are absolutely essential to an understanding of the principle of the device are shown. I do not imply any limitation to the particular train stop and signal mechanisms shown, but expressly state that the relay structure illustrated may in the form shown or in certain modified forms, be availed of to operate various other known types of device. The particular arrangement of cores and armatures, and the use of the frame and wheel as a part of the magnetic circuit offer practical operating advantages, but I do not limit myself to their use except to the extent specified in the claims.

In certain of the claims I shall use the term "control mechanism" to indicate generally any cab signal or train stop mechanism suitable for use in controlling railway trains.

In certain of the claims, also, I shall refer to the train-carried core with its exciting windings as an electromagnet, and similarly refer to the armature with its exciting windings as an electromagnet.

Having thus described my invention what I claim is:—

1. In a device for controlling railway trains, the combination with a control mechanism of an electromagnet mounted on the train and including a core and an exciting winding thereon, said winding being in circuit with a source of electric current; a relay switch serving to operate said control mechanism; a secondary winding on said core and in circuit with the winding of said relay switch, whereby an impulse generated in said secondary winding serves to actuate the relay switch; an armature on the track in position to reduce the reluctance of the magnetic circuit through the core of said electromagnet when the core passes the armature in the movement of the train, the core of said electromagnet being mounted directly on the frame adjacent a wheel and the armature being directly connected to the track rail, whereby the frame, wheel and rail form part of the magnetic circuit at the moment of passage of the core and armature; a winding on said armature; and a current source and controlling switch in circuit with said armature winding, and serving when said switch is closed to excite said armature winding in opposition to the excitation of said electromagnet.

2. In a device for controlling railway vehicles, the combination of a track having rails; a railway wheeled vehicle running on said rails; a core mounted on said vehicle in position to offer an open magnetic circuit through itself and a wheel of said vehicle; a core on said track in position to offer an open magnetic circuit through itself and a rail of said track, the parts above enumerated being so arranged that at the moment of passage of said vehicle-carried core past said track-core a substantially closed magnetic circuit is afforded through the wheel rail and cores; energy developing means associated with said cores and including an inductive winding; and train controlling means operable by said energy developing means.

3. In a device for controlling railway vehicles, the combination of a track having rails; a railway wheeled vehicle running on said rails; a core mounted on said vehicle in position to offer an open magnetic circuit through itself and a wheel of said vehicle; a core on said track in position to offer an open magnetic circuit through itself and a rail of said track, the parts above enumerated being so arranged that at the moment of passage of said vehicle-carried core past said track-core a substantially closed magnetic circuit is afforded through the wheel rail and cores; energy developing means including a winding on each of said cores; and train controlling means operable by said energy developing means.

4. In a device for controlling railway vehicles, the combination of a track having rails; a railway wheeled vehicle running on said rails; a core mounted on said vehicle in position to offer an open magnetic circuit through itself and a wheel of said vehicle; a core on said track in position to offer an open magnetic circuit through itself and a rail of said track, the parts above enumerated being so arranged that at the moment of passage of said vehicle-carried core past said track-core a substantially closed magnetic circuit is afforded through the wheel rail and cores; energy developing means including a winding on each of said cores and an impulse winding on said train-carried core; and train controlling means operatively connected with said impulse winding.

In testimony whereof I have signed my name to this specification.

ERWIN C. VROMAN.